United States Patent [19]

Uuskallio

[11] 4,013,105
[45] Mar. 22, 1977

[54] SPILLED FUEL DIVERTER FOR SMALL ENGINES
[75] Inventor: Arvo Foster Uuskallio, Colgate, Wis.
[73] Assignee: Briggs & Stratton Corporation, Wauwatosa, Wis.
[22] Filed: June 9, 1975
[21] Appl. No.: 585,064
[52] U.S. Cl. .............................. 141/86; 123/198 E; 141/98; 184/106
[51] Int. Cl.² ..................... B65B 3/04; B65B 39/00
[58] Field of Search .......................... 141/297–300, 141/392, 98, 331–345, 86, 391, 115, 199–205; 123/198 E, 195 C, 195 S, 198 R; 184/106; 220/86 R, 85 P, DIG. 5; 222/108, 109, 110; 137/313, 312, 314

[56] References Cited
UNITED STATES PATENTS

| 238,774 | 3/1881 | Fletcher | 141/86 |
| 545,866 | 9/1895 | Sattelkau et al. | 220/86 R X |
| 1,810,822 | 6/1931 | Erickson | 220/86 R X |
| 1,844,709 | 2/1932 | Williams | 222/108 |
| 1,961,563 | 6/1934 | Luckie | 141/86 |
| 2,579,065 | 12/1951 | Channell | 141/86 |
| 2,684,114 | 7/1954 | Johannesen | 222/108 |
| 2,778,390 | 1/1957 | Young | 141/392 X |
| 3,791,116 | 2/1974 | Wykhuis | 56/17.5 |

Primary Examiner—Richard E. Aegerter
Assistant Examiner—Frederick R. Schmidt
Attorney, Agent, or Firm—Ira Milton Jones and Associates

[57] ABSTRACT

A pan-like spilled fuel diverter overlies the fuel tank of a small engine and has the filler neck on the top of the tank projecting through a hole in the bottom wall of the diverter with a liquid-tight connection therebetween. A portion of the diverter projects laterally beyond a side of the tank remote from the engine cylinder and has a downwardly projecting discharge spout spaced from the tank. A downwardly and outwardly slanting deflector at the bottom end of the spout directs spilled liquid that is caught by the diverter away from the tank.

3 Claims, 5 Drawing Figures

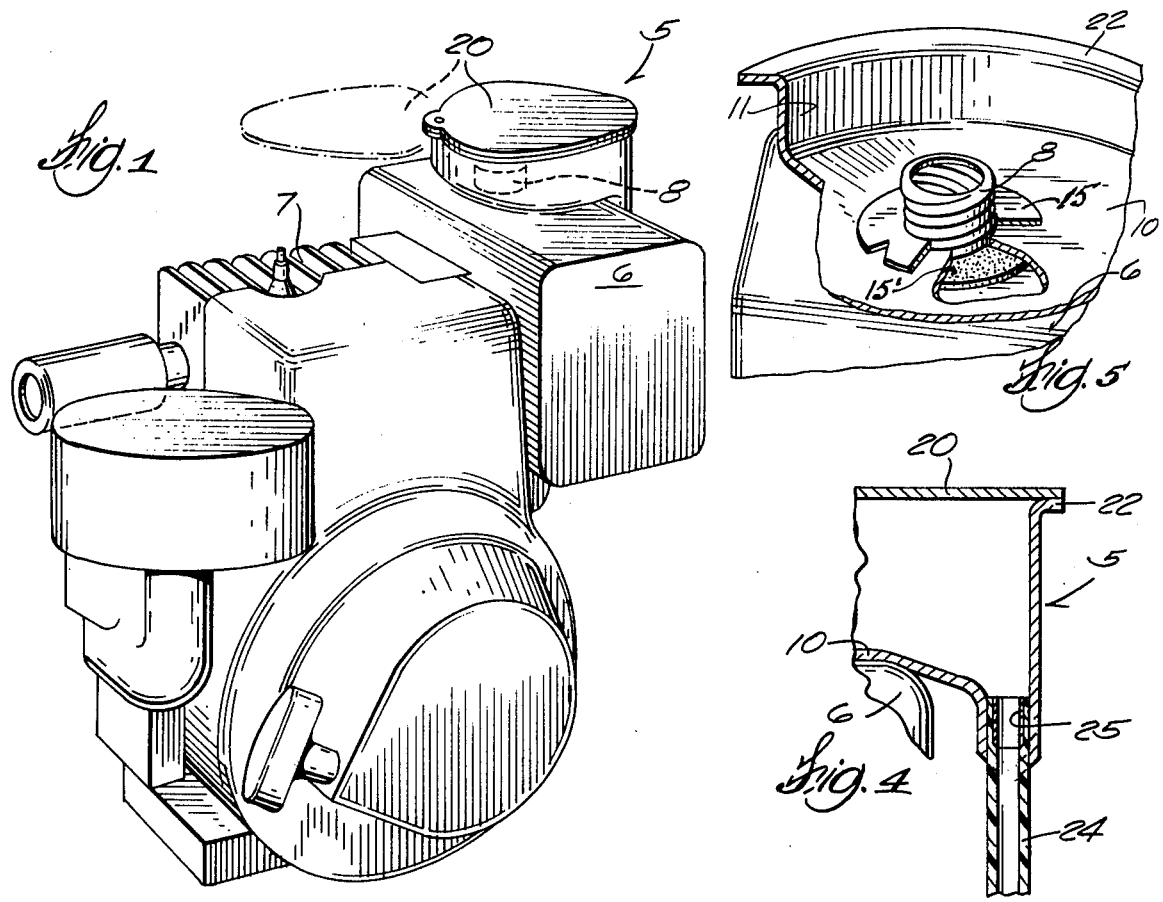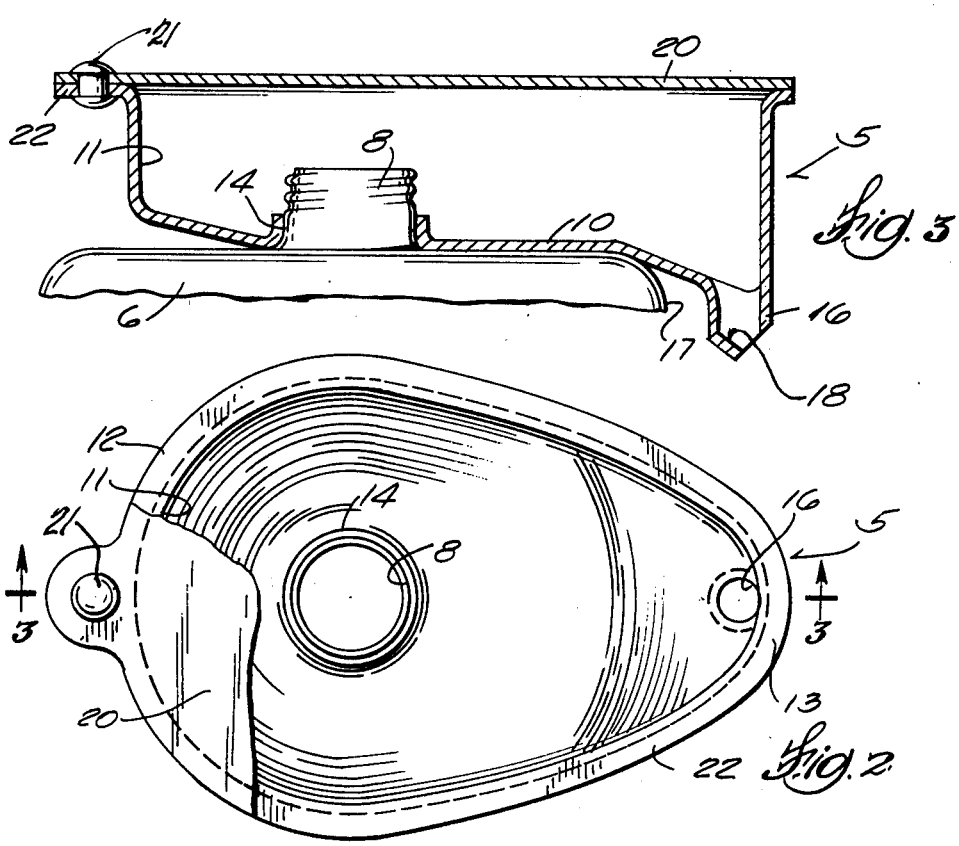

SPILLED FUEL DIVERTER FOR SMALL ENGINES

This invention relates to safety devices for small gasoline engines such as are used to power lawn mowers, garden tractors and similar machines; and the invention is more particularly concerned with means for preventing fuel that is spilled during filling of the engine fuel tank from coming into contact with parts of the engine that become highly heated when the engine is running.

Most of the small engines used for powering such machines as lawn mowers, garden tractors and portable pumps and electrical generators are manufactured as self-contained power plants, with a fuel tank mounted on the body of the engine, closely adjacent to its cylinder. The fuel tank, which may hold on the order of a gallon of gasoline, is filled through an upwardly projecting filler neck on its top, which is closed by a screw-on cap. Almost invariably such engines are fueled from a gasoline can, and more often than not a certain amount of fuel is spilled or sloshed outside the tank during the filling operation.

Obviously the occurrence of fuel spillage presents a serious fire hazard when the engine is hot. In a well designed engine, the muffler — which is the hottest exposed part of the engine — is located as far as possible from the fuel tank, but the fuel tank must almost necessarily be mounted directly adjacent to the engine cylinder, which also tends to become very hot. Even though the cylinder may never be heated to the kindling temperature of the fuel, any gasoline spilled on it will be vaporized almost instantly, and the resultant high concentration of fuel vapor poses a serious fire and explosion hazard.

The present invention has as its general object the provision of simple, inexpensive and effective means for catching gasoline spilled during filling of the fuel tank of a small engine and for conducting such gasoline safely away from hot parts of the engine.

Another and more specific object of the invention is to provide a spilled fuel diverter that assuredly conducts spilled fuel away from the surface of a fuel tank on which the diverter is installed so that such fuel can not run down along wall surfaces of the fuel tank and drip from it onto parts of the engine that may be highly heated.

Another object of the invention is to provide a spilled fuel diverter of the character described that is attractive in appearance and can be readily and inexpensively molded in one piece from plastic material.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate a complete example of an embodiment of the invention constructed according to the best mode so far devised for the practical application of the principles thereof, and in which:

FIG. 1 is a perspective view of an engine equipped with the spill diverter of this invention;

FIG. 2 is a plan view of the spill diverter per se with its cover partially broken away;

FIG. 3 is a view in vertical section through the spill diverter, taken on the plane of the line 3—3 in FIG. 2, and showing the upper portion of the fuel tank on which the spill diverter is mounted;

FIG. 4 is a fragmentary sectional view through the discharge spout of the spill diverter equipped with a drain hose; and FIG. 5 is a fragmentary perspective view illustrating another way of securing the spill diverter to a fuel tank.

Referring now more particularly to the accompanying drawings, the numeral 5 designates generally a spilled fuel diverter which is mounted on the top of a gasoline tank 6 that is, in turn, mounted on a small gasoline engine, closely adjacent to the cylinder 7 of the engine. The tank 6, as is more or less conventional, has a filler neck 8 that projects up from its top wall and through which it is filled. The filler neck is threaded to receive a screw-on cap or closure (not shown).

The spilled fuel diverter 5 comprises a shallow pan having a bottom wall 10 that overlies the top wall of the tank. An upright side wall 11 projects up from the bottom wall, all around it, to a level above the top of the filler neck.

In plan form the fuel diverter pan is oval, with a larger radius end portion 12 at the side of the fuel tank that is adjacent to the engine cylinder 7, and with a smaller radius end portion 13 that projects a distance beyond the tank at the side thereof remote from the cylinder. The filler neck projects upwardly through a hole in the bottom wall 10, and the diverter pan is secured in place by an upstanding flange 14 which projects upward from the bottom wall around said hole and embraces the filler neck with a tight fit. Since the flange 14 is integral with the bottom wall of the diverter pan, and since it rises to a significant level above the bottom wall, the tight fit of the flange on the filler neck provides assurance against leakage at the junction of the diverter pan with the fuel tank. This manner of mounting the diverter pan can be used with metal fuel tanks, but for molded plastic fuel tanks the attachment illustrated in FIG. 5 is more effective. In this case there is no upstanding flange around the hole in the bottom wall of the pan to embrace the filler neck. Instead, a stamped metal nut 15 threaded on the filler neck clamps the bottom wall 10 to the top of the fuel tank with a sealing gasket 15' therebetween.

For much of its area, the bottom wall 10 of the fuel diverter pan is inclined downwardly from the larger radius end portion of the pan to its smaller radius end portion, so that spilled fuel falling anywhere on the bottom wall of the diverter flows towards its smaller radius end, at which there is a drain spout 16. The drain spout, which projects downwardly from the bottom wall of the spilled fuel diverter, is spaced outwardly from the adjacent side wall 17 of the tank.

It is a feature of the fuel diverter of this invention that at the bottom of the outlet or drain spout 16 there is a deflector wall 18 that slants downwardly and away from the adjacent wall 17 of the fuel tank at an angle of approximately 45°. The edge of this deflector wall - as clearly shown in FIG. 3 - forms the lowermost extremity of the spout. Hence the fuel that is caught by the diverter and runs down the spout will leave the spout in an outwardly directed stream. This formation of the discharge end of the spout, together with the spacing of the spout as a whole from the fuel tank, assures that fuel flowing or dripping out of the spout will not run down along the tank, even when a strong wind or draft tends to blow it towards the tank.

It will be apparent that the entire fuel diverter, including the outlet spout and the filler neck flange, can readily be molded as a unit, of plastic. If desired, a flat cover 20 may be pivoted, as by means of a rivet 21, to a laterally outwardly projecting lip 22 on the upper edge of the side wall 11, at the larger radius end of the diverter pan, to swing edgewise to and from a closed position overlying the entire pan and the filler neck.

In some installations it may be desirable to conduct spilled fuel drainage to a specific location beneath the engine. For such installations, the deflector wall 18 is cut away and a drainage hose 24 of Neoprene or similar rubber-like material extends downwardly from the spout towards the location to which spillage is to drain. The upper end portion of the hose is snugly received in the outlet spout, and to prevent the hose from being pulled out of the spout, a short thin-walled tube or ferrule 25 is inserted into the upper end portion of the hose. The insertion of the ferrule clamps the wall of the hose tightly against the inside of the spout and thus secures the hose against lengthwise displacement relative to the spout.

The inner wall of the spout can have a small downward taper to facilitate molding and also to cooperate with the ferrule 25 in securing the hose. When the spout has such taper, the hose is most readily installed by inserting the hose with the ferrule in place therein into the spout from the upper end thereof and pulling it downwardly through the spout until its upper end is at or slightly below the level of adjacent portions of the bottom wall.

From the foregoing description taken with the accompanying drawing, it will be apparent that this invention provides a simple, inexpensive and effective spilled fuel diverter by which gasoline spilled during the filling of a small engine fuel tank can be drained to a location away from hot parts of the engine.

Those skilled in the art will appreciate that the invention can be embodied in forms other than as herein disclosed for purposes of illustration.

The invention is defined by the following claims.

I claim:

1. In combination:
   A. an internal combustion engine having parts with exposed surfaces that become highly heated when the engine is in operation;
   B. a fuel tank mounted on the body of the engine adjacent to its said exposed surfaces, said fuel tank having an upstanding filler neck on its top wall;
   C. a collecting pan surrounding the filler neck and overlying the top of the fuel tank to catch fuel that spills alongside the filler neck during filling of the tank, said collecting pan
      1. having a bottom wall with a hole therein through which the filler neck projects, said bottom wall having an upwardly projecting side wall extending entirely therearound,
      2. having a portion which projects a substantial distance beyond a side of the tank that is remote from said exposed surfaces of said parts of the engine, and
      3. having, in its said portion, an outlet spout which projects downwardly from its bottom wall and which is spaced outwardly from said side of the tank, said outlet spout having at its bottom a deflector wall that slants downwardly and away from said side of the tank, the edge of said deflector wall being the bottommost part of the spout, so that the spilled fuel that is caught in the collecting pan and that runs down the interior of said spout leaves the same in a stream that is directed outwardly away from said exposed surfaces of the engine or drips off of said edge of said deflector wall; and
   D. means coacting with the filler neck of the fuel tank to hold the collecting pan in place on the fuel tank, said last named means comprising an upstranding flange integral with the bottom wall of the collecting pan and rising from the edge of the hole therein, said flange tightly gripping the filler neck.

2. The combination defined by claim 1, wherein said collecting pan is substantially oval shaped, with large and small radius ends, wherein a side wall projects upwardly from the bottom wall of the collecting pan all around its periphery,
   wherein said hole in the bottom wall is in the large radius end portion of the collecting pan so that the smaller radius end portion of the collecting pan is spaced a significant distance from the filler neck;
   wherein said outlet spout opens downwardly from the bottom wall of the collecting pan at its smaller radius end portion; and
   wherein the bottom wall of the collecting pan is inclined downwardly towards said spout to direct fuel caught in the pan into the spout.

3. In combination:
   A. an internal combustion engine having parts with exposed surfaces that become highly heated when the engine is in operation;
   B. a fuel tank mounted on the body of the engine adjacent to its said exposed surfaces, said fuel tank having an upstanding filler neck on its top wall;
   C. a collecting pan surrounding the filler neck and overlying the top of the fuel tank to catch fuel that spills alongside the filler neck during filling of the tank, said collecting pan
      1. having a bottom wall with a hole therein through which the filler neck projects, said bottom wall having an upwardly projecting side wall extending entirely therearound,
      2. having a portion which projects a substantial distance beyond a side of the tank that is remote from said exposed surfaces of said parts of the engine, and
      3. having, in its said portion, an outlet spout which projects downwardly from its bottom wall and which is spaced outwardly from said side of the tank, said outlet spout having at its bottom a deflector wall that slants downwardly and away from said side of the tank, the edge of said deflector wall being the bottommost part of the spout, so that the spilled fuel that is caught in the collecting pan and that runs down the interior of said spout leaves the same in a stream that is directed outwardly away from said exposed surfaces of the engine or drips off of said edge of said deflector wall; and
   D. means coacting with the filler neck of the fuel tank to hold the collecting pan in place on the fuel tank, said last named means comprising a stamped metal nut having threaded engagement with the filler neck and clamping the bottom wall of the collecting pan against the top of the fuel tank with a sealing gasket therebetween.

* * * * *